(12) United States Patent
Moriyama et al.

(10) Patent No.: US 7,080,892 B2
(45) Date of Patent: Jul. 25, 2006

(54) PRINTING APPARATUS, INFORMATION PROCESSING APPARATUS, CONTROL METHOD FOR THEM, AND PROGRAM

(75) Inventors: Jiro Moriyama, Kanagawa (JP); Hidehiko Kanda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/411,527

(22) Filed: Apr. 11, 2003

(65) Prior Publication Data

US 2003/0193534 A1 Oct. 16, 2003

(30) Foreign Application Priority Data

Apr. 15, 2002 (JP) .............................. 2002-112656

(51) Int. Cl.
*B41J 29/38* (2006.01)
(52) U.S. Cl. .............................. 347/5; 347/14; 347/37; 358/1.14; 358/1.17
(58) Field of Classification Search ................... 347/5, 347/14, 37; 358/1.16, 1.17; 400/279
See application file for complete search history.

(56) References Cited

U.S. PATENT DOCUMENTS

| | | | |
|---|---|---|---|
| 4,313,124 A | 1/1982 | Hara | 347/57 |
| 4,345,262 A | 8/1982 | Shirato et al. | 347/107 |
| 4,459,600 A | 7/1984 | Sato et al. | 347/47 |
| 4,463,359 A | 7/1984 | Ayata et al. | 347/56 |
| 4,558,333 A | 12/1985 | Sugitani et al. | 347/65 |
| 4,723,129 A | 2/1988 | Endo et al. | 347/56 |
| 4,740,796 A | 4/1988 | Endo et al. | 347/56 |
| 5,173,717 A | 12/1992 | Kishida et al. | 347/13 |
| 5,550,954 A | 8/1996 | Campbell et al. | 358/1.6 |
| 5,610,638 A * | 3/1997 | Courtney | 347/14 |
| 5,680,522 A * | 10/1997 | Kasai | 358/1.14 |
| 5,721,581 A * | 2/1998 | Saito et al. | 347/249 |
| 5,825,993 A | 10/1998 | Shimura et al. | 358/1.16 |
| 5,920,681 A * | 7/1999 | Hori | 358/1.5 |
| 5,923,820 A | 7/1999 | Cunnagin et al. | 358/1.8 |
| 5,971,518 A | 10/1999 | Bolash et al. | 347/13 |
| 6,097,499 A | 8/2000 | Casey et al. | 358/1.16 |
| 6,120,129 A | 9/2000 | Iwasaki et al. | 347/14 |
| 6,128,098 A | 10/2000 | Kamada et al. | 358/1.8 |
| 6,158,836 A | 12/2000 | Iwasaki et al. | 347/15 |
| 6,247,786 B1 | 6/2001 | Booth et al. | 347/40 |
| 6,264,305 B1 | 7/2001 | Inui et al. | 347/40 |
| 6,313,922 B1 | 11/2001 | Jackson | 358/1.16 |

(Continued)

FOREIGN PATENT DOCUMENTS

EP 0 713 191 5/1996

(Continued)

OTHER PUBLICATIONS

U.S. Appl. No. 10/281,183, filed Oct. 28, 2002, Jiro Moriyama, Yuji Hamasaki, Yoshinori Nakagawa.

(Continued)

*Primary Examiner*—Thinh Nguyen
(74) *Attorney, Agent, or Firm*—Fitzpatrick, Cella, Harper & Scinto

(57) ABSTRACT

A printing apparatus receives, from a host apparatus, main scanning/printing direction information representing the main scanning/printing direction of a printhead. The printing apparatus stores, in a print buffer, print data corresponding to the printing direction represented by the main scanning/printing direction information generated by the host apparatus. The CPU of the printing apparatus controls printing by the printhead on the basis of the main scanning/printing direction information and the print data stored in the print buffer.

10 Claims, 6 Drawing Sheets

U.S. PATENT DOCUMENTS 6,328,406 B1 * 12/2001 Takahashi .................... 347/15
6,612,674 B1    9/2003  Holtzman et al. ............ 347/14

FOREIGN PATENT DOCUMENTS

| EP | 0 916 495      | 5/1999  |
| EP | 0 917 093      | 5/1999  |
| EP | 0 917 095      | 5/1999  |
| EP | 1120253 A1 *   | 8/2001  |
| JP | 58-146929      | 9/1983  |
| JP | 59-123670      | 7/1984  |
| JP | 59-138461      | 8/1984  |
| JP | 10-278318      | 10/1998 |
| JP | 11-227181      | 8/1999  |
| JP | 11-259248      | 9/1999  |

OTHER PUBLICATIONS

U.S. Appl. No. 10/411,111, filed Apr. 11, 2003, Jiro Moriyama, Hidehiko Kanda.

U.S. Appl. No. 10/411,189, filed Apr. 11, 2003, Jiro Moriyama, Hidehiko Kanda.

U.S. Appl. No. 10/411,298, filed Apr. 11, 2003, Hidehiko Kanda, Jiro Moriyama.

U.S. Appl. No. 10/413,144, filed Apr. 15, 2003, Toru Nakayama, Souhei Tanaka, Tetsushi Kono, Takeaki Nakano.

U.S. Appl. No. 10/413,146, filed Apr. 15, 2003, Souhei Tanaka, Akira Kuronuma, Toru Nakayama, Tetsushi Kono.

U.S. Appl. No. 10/413,485, filed Apr. 15, 2003, Akira Kuronuma, Souhei Tanaka, Hidehiko Kanda, Takeaki Nakano.

* cited by examiner

PRINTING APPARATUS, INFORMATION PROCESSING APPARATUS, CONTROL METHOD FOR THEM, AND PROGRAM

FIELD OF THE INVENTION

The present invention relates to a printing apparatus and printing method and, particularly, to a technique of implementing a low-cost, high-speed, high-quality printing apparatus. More particularly, the present invention relates to an inkjet printing apparatus and control method therefor which maintain a high speed or high image quality while reducing the RAM capacity or ROM capacity in the printing apparatus or the number of gates of an ASIC to implement a low-cost printing apparatus. The present invention also relates to an inkjet printing apparatus and control method therefor which perform printing proper for the relationship between the host apparatus of a system and the printing apparatus.

BACKGROUND OF THE INVENTION

Inkjet printing apparatuses have widely been used in printing apparatuses, copying machines, and the like because low noise, low apparatus cost, low running cost, compact apparatus, and the like can be facilitated.

A conventional serial inkjet printing apparatus prints one page by repeating main scanning of scanning a printhead in the main scanning direction and sub-scanning of conveying a printing medium in the sub-scanning direction. The serial inkjet printing apparatus ensures a memory (print buffer) having enough capacity to store print data of at least one scanning. After all print data of one scanning is stored in the print buffer, main scanning of the printhead starts. Especially with the development of color printing apparatuses and an increase in resolution in response to demands for higher image qualities, the capacity necessary for the print buffer increases. The printing apparatus requires an expensive larger-capacity memory, resulting in a high apparatus cost.

To solve the conventional problem, Japanese Patent Laid-Open No. 58-146929 discloses a technique of constituting a memory whose capacity is smaller than a capacity for storing print data of one scanning, managing print data by a storage address, and efficiently exploiting the small-capacity memory.

Japanese Patent Laid-Open No. 11-227181 discloses a technique of reducing a memory capacity for storing print data by transmitting print data corresponding to a nozzle for use from a host apparatus to a printing apparatus by using a printhead having a plurality of nozzles in the sub-scanning direction and using a printing apparatus which repeats main scanning and sub-scanning to form an image.

Japanese Patent Laid-Open No. 11-259248 discloses a technique of achieving reduction in memory capacity and high-speed printing by starting main scanning of a printhead before the completion of storing print data of one main scanning in a memory. This proposal assumes that enough data to complete scanning is always received during scanning/printing while main scanning of the printhead is executed. Thus, the memory capacity cannot be greatly reduced.

However, no proposal realizes high-speed printing at lower cost by considering print data and the main scanning start timing without changing an existing arrangement.

SUMMARY OF THE INVENTION

The present invention has been made to overcome the conventional drawbacks, and has as its object to provide a printing apparatus which can implement a low-cost, compact printing apparatus without degrading the original performance of the apparatus and can realize high-speed printing, an information processing apparatus, a control method for the printing apparatus and information processing apparatus, and a program.

According to the present invention, the foregoing object is attained by providing a printing apparatus which performs printing by driving a printhead on the basis of print data transmitted from a host apparatus, comprising:

main scanning means for scanning the printhead in a main scanning direction with respect to a printing medium;

buffer means for storing print data;

reception means for receiving, from the host apparatus, main scanning/printing direction information representing a main scanning/printing direction of the printhead;

storage means for storing, in the buffer means, print data corresponding to the printing direction represented by the main scanning/printing direction information generated by the host apparatus; and control means for controlling printing by the printhead on the basis of the main scanning/printing direction information and the print data stored in the buffer means.

In a preferred embodiment, when print data are stored up to a specific column position in the buffer means, the control means starts printing by the printhead on the basis of the main scanning/printing direction information and the print data stored in the buffer means.

In a preferred embodiment, when print data are stored up to a position corresponding to a specific column unit in the buffer means, the control means starts printing by the printhead on the basis of the main scanning/printing direction information and the print data stored in the buffer means.

In a preferred embodiment, the specific column unit is $2^{k1} \times k2$ (k1 and k2 are positive integers).

In a preferred embodiment, the buffer means stores print data used for printing during scanning of the printhead by the main scanning means, and a data amount which can be stored is smaller than a print data amount for printing by one main scanning of the printhead by a width printable by main scanning of the printhead by the main scanning means.

In a preferred embodiment, the buffer means stores print data used for printing during scanning of the printhead by the main scanning means, and a data amount which can be stored is at least a print data amount for one main scanning of the printhead by the main scanning means.

In a preferred embodiment, when print data of one main scanning are stored in the buffer means, the control means starts printing by the printhead on the basis of the main scanning/printing direction information and the print data stored in the buffer means.

According to the present invention, the foregoing object is attained by providing an information processing apparatus which transmits print data to a printing apparatus that has a buffer for storing print data and performs printing by scanning a printhead in a main scanning direction with respect to a printing medium on the basis of the print data stored in the buffer, comprising:

first transmission means for generating main scanning/printing direction information representing a main scanning/ printing direction of the printhead, and transmitting the main scanning/printing direction information to the printing apparatus;

generation means for generating print data corresponding to the printing direction represented by the main scanning/printing direction information; and second transmission means for transmitting the print data generated by the generation means to the printing apparatus.

According to the present invention, the foregoing object is attained by providing a method of controlling a printing apparatus which has a buffer for storing print data and performs printing by scanning a printhead in a main scanning direction with respect to a printing medium on the basis of print data from a host apparatus that is stored in the buffer, comprising:

a reception step of receiving, from the host apparatus, main scanning/printing direction information representing a main scanning/printing direction of the printhead;

a storage step of storing, in the buffer, print data corresponding to the printing direction represented by the main scanning/printing direction information generated by the host apparatus; and a control step of controlling printing by the printhead on the basis of the main scanning/printing direction information and the print data stored in the buffer.

According to the present invention, the foregoing object is attained by providing a method of controlling an information processing apparatus which transmits print data to a printing apparatus that has a buffer for storing print data and performs printing by scanning a printhead in a main scanning direction with respect to a printing medium on the basis of the print data stored in the buffer, comprising:

a first transmission step of generating main scanning/printing direction information representing a main scanning/printing direction of the printhead, and transmitting the main scanning/printing direction information to the printing apparatus;

a generation step of generating print data corresponding to the printing direction represented by the main scanning/printing direction information; and a second transmission step of transmitting the print data generated in the generation step to the printing apparatus.

According to the present invention, the foregoing object is attained by providing a program of causing a computer to control a printing apparatus which has a buffer for storing print data and performs printing by scanning a printhead in a main scanning direction with respect to a printing medium on the basis of print data from a host apparatus that is stored in the buffer, comprising:

a program code for a reception step of receiving, from the host apparatus, main scanning/printing direction information representing a main scanning/printing direction of a printhead;

a program code for a storage step of storing, in the buffer, print data corresponding to the printing direction represented by the main scanning/printing direction information generated by the host apparatus; and a program code for a control step of controlling printing by the printhead on the basis of the main scanning/printing direction information and the print data stored in the buffer.

According to the present invention, the foregoing object is attained by providing a program of causing a computer to control an information processing apparatus which transmits print data to a printing apparatus that has a buffer for storing print data and performs printing by scanning a printhead in a main scanning direction with respect to a printing medium on the basis of the print data stored in the buffer, comprising:

a program code for a first transmission step of generating main scanning/printing direction information representing a main scanning/printing direction of the printhead, and transmitting the main scanning/printing direction information to the printing apparatus;

a program code for a generation step of generating print data corresponding to the printing direction represented by the main scanning/printing direction information; and a program code for a second transmission step of transmitting the print data generated in the generation step to the printing apparatus.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail below with reference to the accompanying drawings.

First Embodiment

Figure 1:
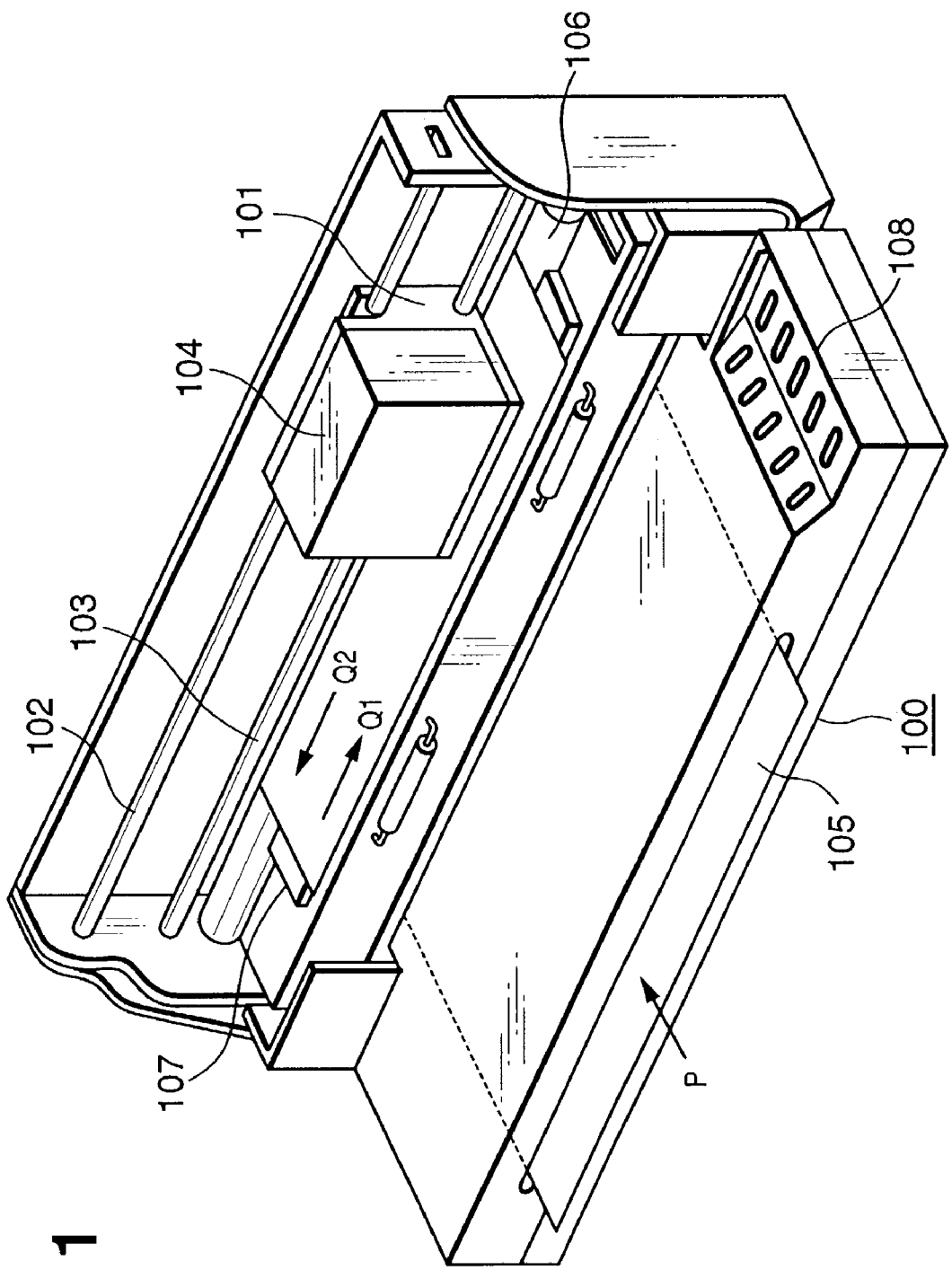
FIG. 1 is a perspective view showing the schematic arrangement of an inkjet printing apparatus to which the present invention can be applied.

FIG. 1 is a perspective view showing the schematic arrangement of an inkjet printing apparatus to which the present invention can be applied.

The inkjet printer (printing apparatus 100) can perform both color printing and monochrome printing. For a monochrome printing apparatus, the printhead is equipped with only nozzles for discharging black ink (to be described later).

A printing medium 105 inserted into the sheet feed position of the printing apparatus 100 is fed by a feed roller 106 in a direction indicated by an arrow P, and conveyed to the printable region of a printhead 104. A platen 107 is arranged below the printing medium 105 in the printable region. A carriage 101 can be moved along two guide shafts 102 and 103. The carriage 101 is reciprocally scanned by driving of a stepping motor (not shown) within a scanning region including a printing region in directions indicated by arrows Q1 and Q2 serving as main scanning directions. After one main scanning ends, the printing medium is fed by a predetermined amount in the sub-scanning direction indicated by the arrow P, and waits for the next main scanning. Main scanning and sub-scanning are repeated to perform printing operation of one page.

As for a printing width in the main scanning direction, a region where the printhead 104 can be mechanically scanned is determined by the apparatus design. The maximum printing width is determined depending on the apparatus in correspondence with the scanning region. Printing can be done for a printing medium 105 having a printing width determined by the scanning region of the printhead 104 or a printing medium 105 having a smaller printing width in the printing apparatus 100.

In FIG. 1, the printhead 104 mounted on the carriage 101 includes orifices (printing elements) capable of discharging ink, and an ink tank which contains ink. The printhead 104 is mounted on the carriage 101 such that printing is done by discharging ink from the orifice of the printhead 104 to the printing medium 105 below it.

Reference numeral 108 denotes an operation panel including switches and a display. The switches are used to power on/off the printing apparatus 100 or set various printing modes. The display can display various statuses of the printing apparatus 100.

The printhead 104 can print data in four colors: yellow (Y), magenta (M), cyan (C), and black (Bk). The number of orifices for each of Y, M, and C is 128, and the number of orifices for Bk is 320. The layout pitch between orifices for each color is 1/600 inch in the sub-scanning direction, which corresponds to about 42 µm. The driving frequency of the printhead 104 is generally 15 kHz, and the printhead 104 can perform printing operation at a density of 600 dpi in the main scanning direction. The main scanning speed of the carriage 101 in printing operation is generally 25 inch/sec.

A linear encoder (not shown) with a slit at a cycle of 600 dpi is arranged on the back side of the carriage 101. A mechanical controller 404 (FIG. 3) operates the carriage motor of a mechanical unit 405, reciprocating the carriage 101 in the main scanning direction (directions indicated by Q1 and Q2 in FIG. 1).

The carriage motor which drives the carriage 101 is, e.g., a DC motor. In general printing operation, the position or moving speed of the carriage 101 is detected by an optical sensor on the back side of the carriage 101 by using the linear encoder. The scanning speed of the carriage 101 is kept constant under DC servo control.

The orifice layout of the printhead 104 will be explained with reference to FIG. 2.

Figure 2:
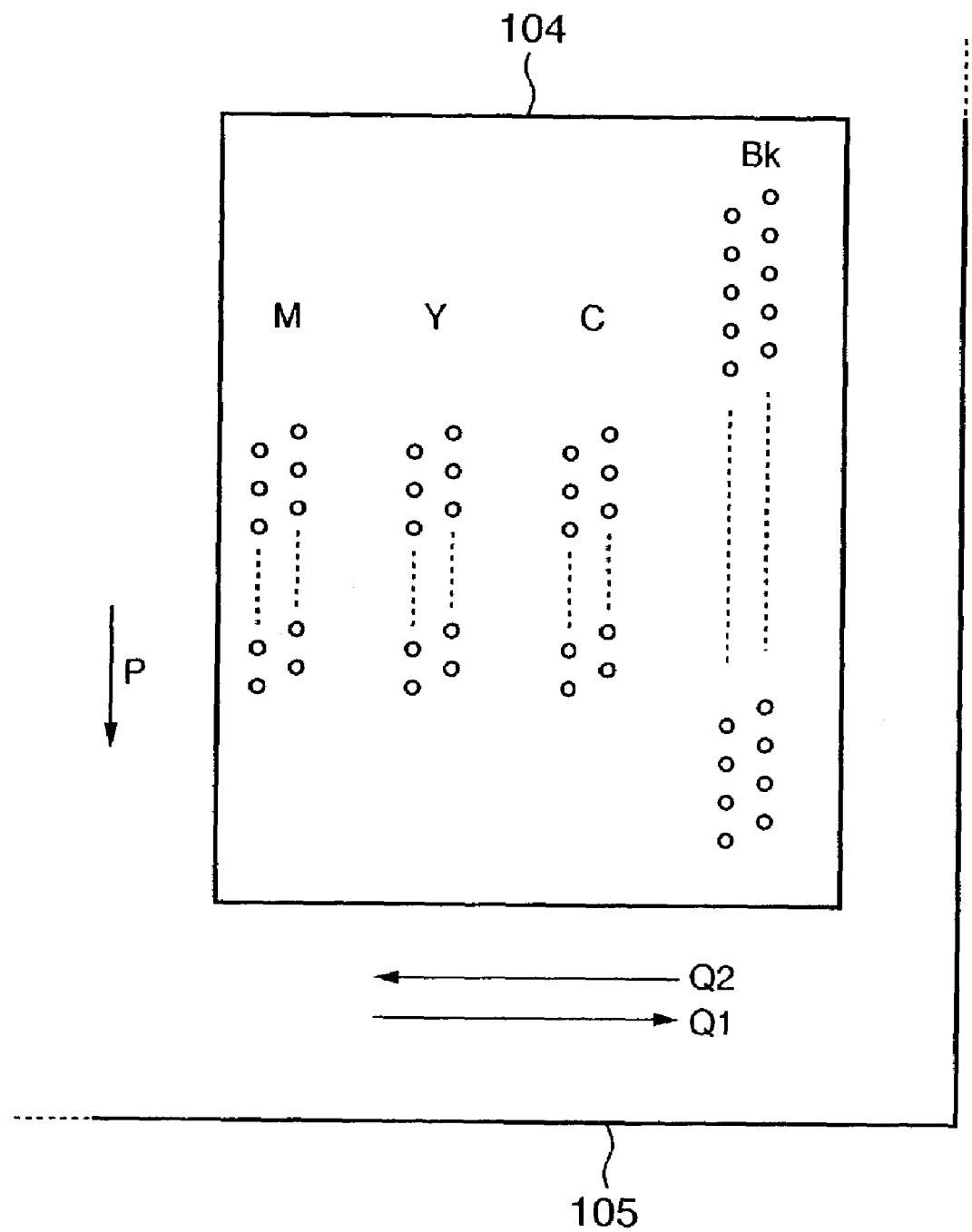
FIG. 2 is a view showing the orifice layout of a printhead according to the first embodiment.

FIG. 2 is a view showing the orifice layout of the printhead according to the first embodiment.

As described above, the printhead 104 has orifices for discharging a plurality of color inks in yellow (Y), magenta (M), cyan (C), and black (K). In practice, orifices for each color are arrayed in two lines, and the layout pitch between the lines is 1/300 inch. The printhead 104 moves in the main scanning directions indicated by the arrows Q1 and Q2 with respect to the printing medium 105. The printing medium 105 is relatively moved in the direction indicated by the arrow P with respect to the printhead 104.

The main arrangement of a printing system comprised of the printing apparatus 100 and a host apparatus will be explained with reference to FIG. 3.

Figure 3:
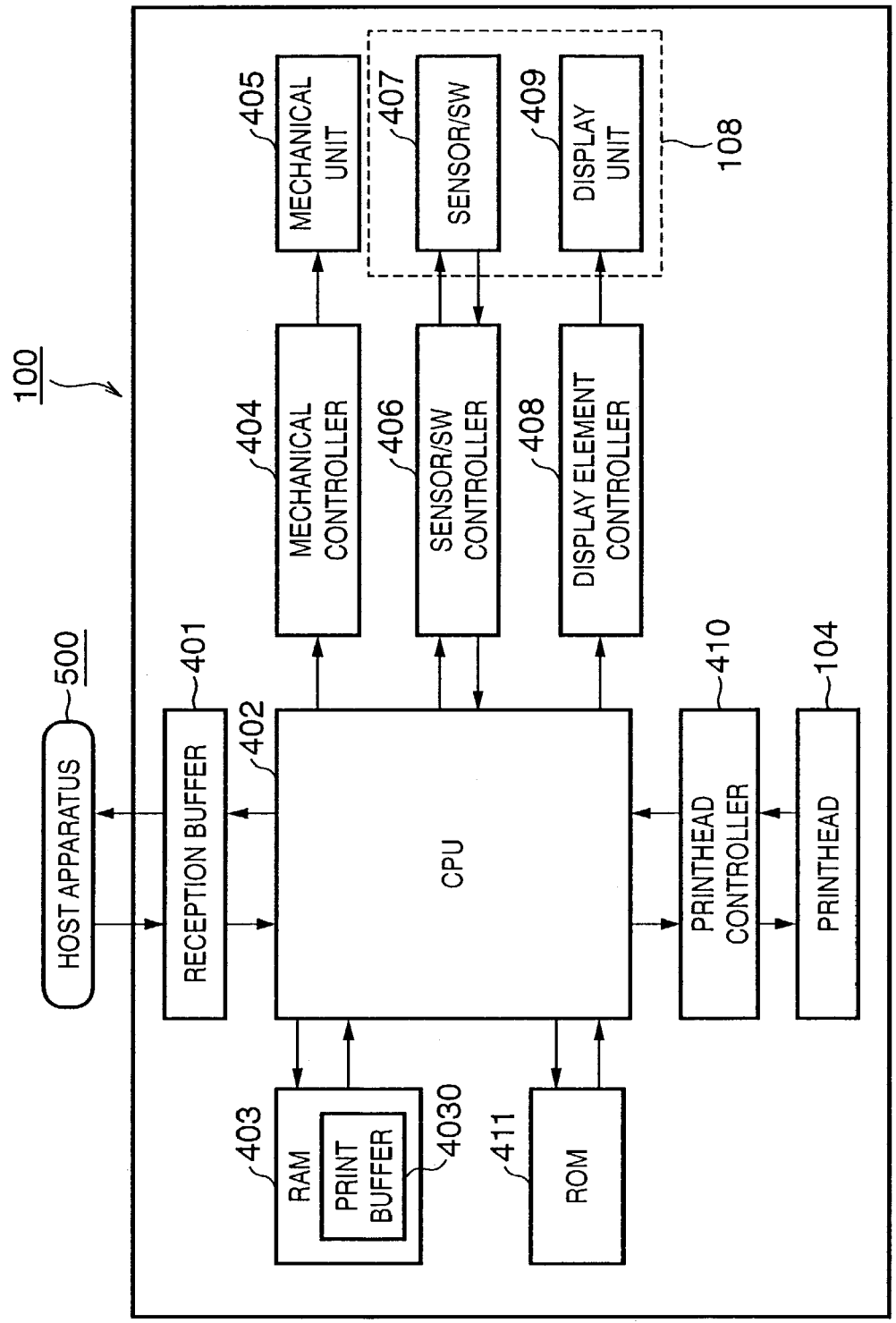
FIG. 3 is a block diagram showing the main arrangement of the inkjet printing apparatus to which the present invention can be applied.

FIG. 3 is a block diagram showing the main arrangement of the inkjet printing apparatus to which the present invention can be applied.

An external host apparatus 500 is connected to the printing apparatus 100. Print data (e.g., data containing character data, image data, and control data) is transmitted from the host apparatus 500 to the printing apparatus 100, and stored in a reception buffer 401. Verify data for verifying whether print data is correctly transferred, and status data representing the operation status of the printing apparatus 100 are transmitted from the printing apparatus 100 to the host apparatus 500.

Note that the host apparatus 500 and printing apparatus 100 are connected by, e.g., a USB interface. However, the present invention is not limited to this. For example, the types of interface include IEEE 1394, IEEE 1284 (Centronics), IrDA, Bluetooth, or the like. There is also available another interface which can also transfer data by connecting the host apparatus 500 and printing apparatus 100 by wire or wirelessly.

Print data stored in the reception buffer 401 is processed into data for printing in main scanning of the printhead 104 under the control of a CPU 402. The resultant data is stored in a print buffer 4030 within a random access memory (RAM) 403. The print buffer 4030 stores data used for printing by the printhead 104. Data stored in the print buffer 4030 is transferred to the printhead 104, and then printing is executed.

In the example shown in FIG. 3, an area for the print buffer 4030 is ensured in the memory area of the RAM 403. Data in the print buffer 4030 is transferred to the printhead 104 by a printhead controller 410. The printhead 104 is controlled to print character data or image data. The printhead controller 410 detects temperature information or the like representing the state of the printhead 104, and sends the information to the CPU 402. The information is transmitted to the printhead controller 410 which controls driving of the printhead 104.

The mechanical controller 404 drives and controls the mechanical unit 405 such as a carriage motor or line feed motor in response to an instruction from the CPU 402.

A sensor/SW controller 406 transmits a signal to the CPU 402 from a sensor/SW 407 including various sensors and SW (switch).

A display element controller 408 controls a display unit 409 comprised of LEDs, liquid crystal display elements, and the like for display panels in response to an instruction from the CPU 402.

A ROM 411 stores data such as various control programs and various setting data for executing various control operations of the printing apparatus 100. The CPU 402 appropriately loads various control programs and various setting data into the RAM 403, and executes them, thereby executing various control operations of the printing apparatus 100.

In the present invention, the capacity of the print buffer 4030 is set smaller than a data amount printed using all the orifices of the printhead 104 necessary for printing by one main scanning of the printhead 104 by a main scanning/printing width determined depending on the apparatus. That is, the RAM 403 ensures a capacity smaller than the necessary capacity for storing print data of one main scanning in correspondence with the maximum printing width of the apparatus. This setting can reduce the memory capacity of the RAM 403 in the apparatus.

The host apparatus 500 is implemented by a general-purpose computer such as a personal computer or workstation. The host apparatus 500 has standard building components mounted in a general-purpose computer (e.g., a CPU, RAM, ROM, hard disk, external memory, network interface, display, keyboard, and mouse). The building components are not limited to them, and any building components can be adopted as long as they realize the present invention. The building components shown in FIG. 3 may be realized by executing by the CPU a program stored in the internal ROM of the host apparatus 500 or an external memory, or realized by dedicated hardware.

The following embodiment will exemplify 1-pass printing using 128 orifices in the orifices of the printhead 104 for each of Y, M, C, and Bk colors.

In a color printing mode, the entire printing width of 8 inches is printed in four colors at a density of 600 dpi. The print buffer capacity of a printing apparatus necessary in a conventional printing method is 128×4×8×600=2,457,600 bits According to the first embodiment, the memory capacity of the print buffer 4030 is 1,572,864 bits, which is smaller than a memory capacity needed to store all print data of one main scanning. In other words, the memory capacity is set smaller than the memory capacity of the conventional print buffer, thus reducing the system cost.

The print buffer 4030 according to the first embodiment has detailed arrangements A to E.

A: Memory areas are ensured for Y, M, C, and Bk, respectively.

B: Memory areas are ensured in the vertical (sub-scanning) direction and horizontal (main scanning) direction for respective rectangular blocks of printing pixels. The block size is constant commonly to Y, M, C, and Bk in one main scanning.

C: The vertical size (height) of the block can be set by the operation panel 108 or host apparatus 500. The set value is, e.g., an n1 multiple of 8 (n1 is a positive integer). In the first embodiment, e.g., n1=16, and the set value is 8×16=128.

Note that the set value is an n1 multiple of 8 for efficient calculation processing.

D: The horizontal size (width) of the block can be set by the operation panel 108 or host apparatus 500. The set value is, e.g., an n3 multiple of $2^{n2}$ (n2 and n3 are positive integers). In the first embodiment, n2=8, n3=1, and the set value is $2^8 \times 1=256$.

Note that the set value is an n3 multiple of $2^{n2}$ for efficient calculation processing.

E: No memory area is ensured for a block having no data in each color in main printing/scanning. Instead, a zero flag is set, and data of this block is processed as null data in printing. This can save the memory capacity of the print buffer 4030.

With the rectangular block arrangement of the print buffer 4030, the print buffer 4030 can be easily managed. In the first embodiment, the block size is common to Y, M, C, and Bk, which also facilitates management of the print buffer 4030.

Alternatively, the block size can be changed and flexibly cope with printing conditions for effective use of the print buffer 4030.

In the present invention, processing of starting main scanning of the printhead 104 is performed before the print buffer 4030 for one main scanning of the printing apparatus 100 is determined, for the purpose of high-speed printing processing. In reciprocal printing operation, the main scanning/printing direction of the printhead 104 in printing operation of the printing apparatus (direction in which main scanning/printing is done by scanning the printhead 104 from the right or left with respect to the printing medium 105) is determined by an instruction from the host apparatus 500.

When the printhead 104 starts main scanning/printing from the right with respect to the printing medium 105, print data is transferred from the right from the host apparatus 500. When the printhead 104 starts main scanning/printing from the left with respect to the printing medium 105, print data is transferred from the left from the host apparatus 500.

Note that the printhead 104 can print each column.

After print data are determined up to a specific column of one main scanning, main scanning of the printhead 104 starts. Alternatively, main scanning may start after print data are determined up to a specific column unit (block width) of one main scanning. The specific column unit is preferably $2^{k1} \times k2$ (k1 and k2 are positive integers) for processing speed efficiency.

The arrangement of the print buffer 4030 according to the first embodiment will be described with reference to FIG. 4.

Figure 4:
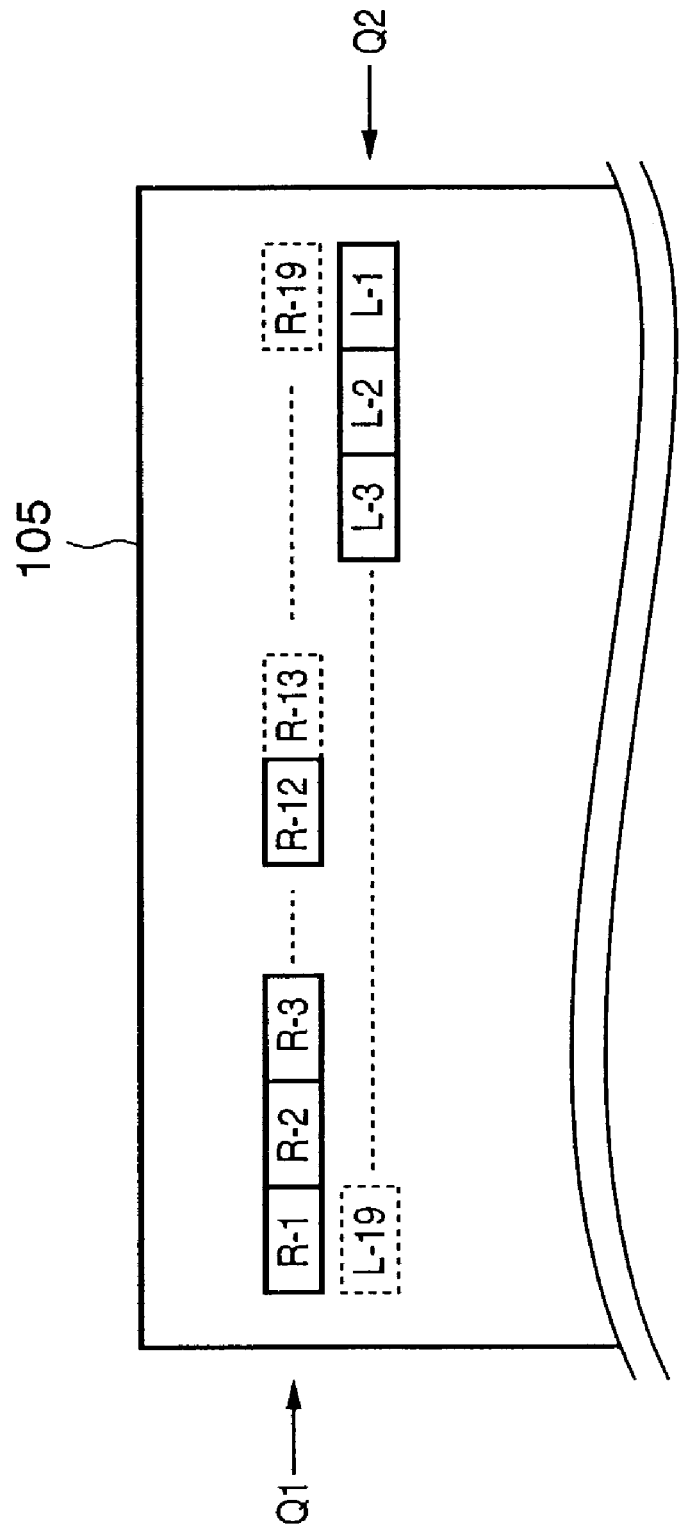
FIG. 4 is a view showing the arrangement of a print buffer according to the first embodiment.

FIG. 4 is a view showing the arrangement of the print buffer according to the first embodiment.

In the printing system of the first embodiment, print data for one main scanning of the printing apparatus 100 is created by the host apparatus 500. Print data is created as binary data obtained by performing proper image processing for character data or image data to be printed, and determining whether to discharge ink droplets for all Y, M, C, and Bk colors. The binary data is assigned and determined as print data for the next main scanning.

In this way, most of data processing concerning printing is performed by the host apparatus 500. The processing burden on the printing apparatus 100 can be reduced, and the ROM capacity for storing control programs and the number of gates of an ASIC can be reduced.

FIG. 4 is a conceptual view showing the block of the print buffer 4030 set when print data corresponding to a width of 8 inches is printed on an A4-size printing medium 105 by one main scanning. In the first embodiment, the resolution in the main scanning direction is 600 dpi. At least 19 blocks with a width of 256 dots are required for printing of the whole width (4,800 dots) in the main scanning direction. Note that the print buffer 4030 in the first embodiment has a small memory capacity. The vertical size (height) of the block is 128 dots, the block width is 256 dots, and the number of blocks which can be ensured is 12.

Reciprocal (two-way) printing operation is done while the printhead 104 is scanned in main scanning directions Q1 and Q2 with respect to an A4-size printing medium 105. Printing operation is performed in the direction Q1 while the printhead 104 moves from the left to right with respect to the printing medium 105. Printing operation is performed in the direction Q2 while the printhead 104 moves from the right to left with respect to the printing medium 105. R-1 to R-19 represent block numbers in printing operation along the direction Q1. L-1 to L-19 represent block numbers in printing operation along the direction Q2.

The number of blocks which can be ensured in the print buffer 4030 is 12. Printing operation in the direction Q1 uses block R-1 as block R-13 when printing of block R-1 ends after the start of main scanning. When printing of block R-2 ends, this block is used as block R-14. Blocks are sequentially used again, ending main scanning.

In the direction Q2 of reciprocal printing operation, similar to the direction Q1, the print buffer 4030 is used as blocks L-1 to block L-19. Block R-19 is followed by L-1 between Q1 and Q2.

Also in two-way printing operation, data are sequentially transferred in accordance with print data to be printed by the printhead 104, and print data corresponding to print columns are stored in the print buffer 4030. Even if scanning of the printhead 104 starts before print data of one main scanning is determined, two-way printing can be executed while print data are sequentially received during printing.

In each of blocks in FIG. 4, a solid line block represents a block which can be ensured as a memory area of the print buffer 4030 at the start of main scanning. A dotted line block represents a block which cannot be ensured as a memory area of the print buffer 4030 at the start of main scanning.

If print data is interrupted during main scanning, i.e., data transfer is left undone, the carriage 101 executes recovery processing of performing the same main scanning again, printing data from the interrupted portion, and thus complementing the data. As for a block having no print data corresponding to a block in each color, no memory area is ensured, and the next block is ensured instead, effectively using the print buffer 4030.

Processing executed by the printing system according to the first embodiment will be explained with reference to FIG. 5.

Figure 5:
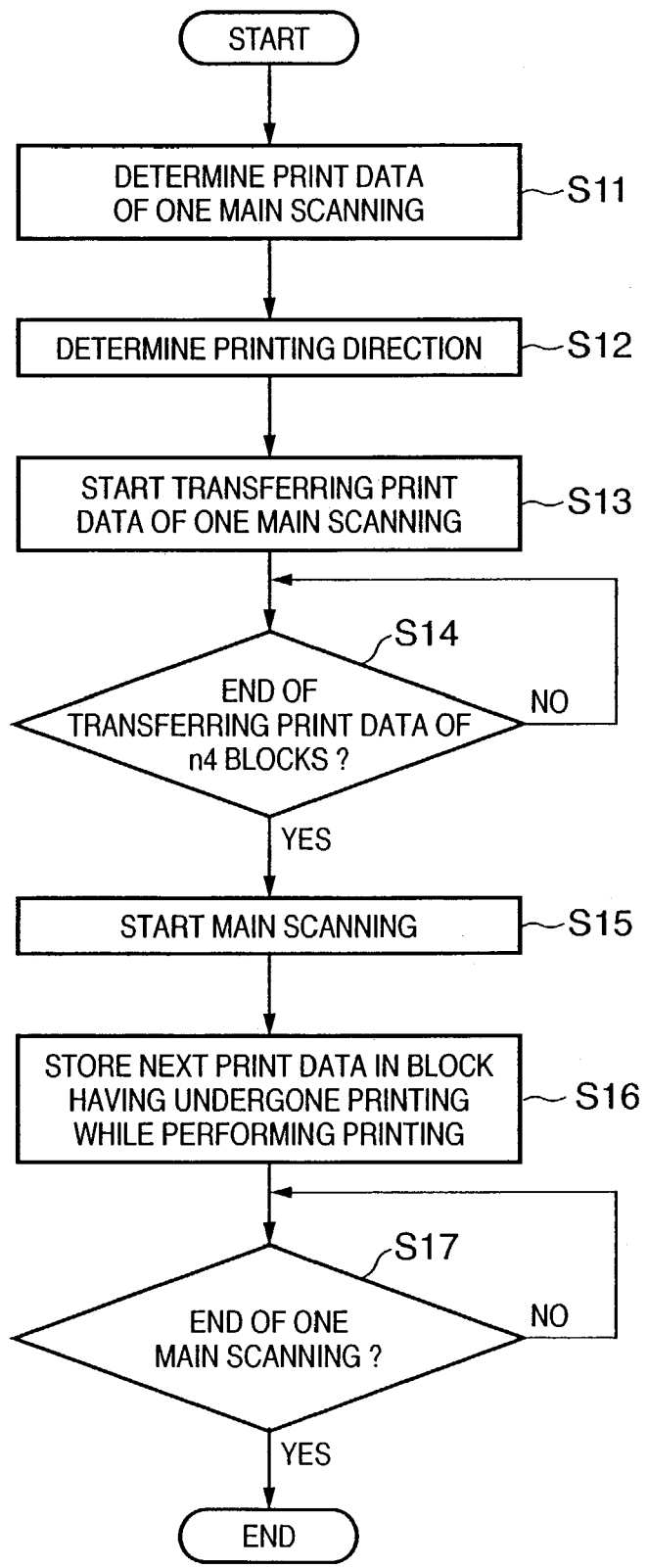
FIG. 5 is a flow chart showing processing executed by a printing system according to the first embodiment.

FIG. 5 is a flow chart showing processing executed by the printing apparatus according to the first embodiment.

In step S11, the host apparatus 500 determines print data of one main scanning.

In step S12, the host apparatus 500 decides the main scanning/printing direction of the printhead 104 of the printing apparatus 100, and transmits main scanning/printing direction information representing the printing direction to the printing apparatus 100. For two-way printing, the printing direction changes every main scanning (directions Q1 and Q2). For one-way printing, the same printing direction is set. To change the direction within one page, the host apparatus 500 properly transmits corresponding main scanning/printing direction information to the printing apparatus 100.

In step S13, transfer of print data of one main scanning starts from the host apparatus 500 to the printing apparatus 100. The layout of print data coincides with the main scanning/printing direction. As for a block having no print data corresponding to a block to be ensured in the print buffer 4030, no memory area is ensured. The next block is ensured instead, effectively using the print buffer 4030.

In step S14, whether print data have been transferred by the number n4 (integer of 1 or more) of printing start blocks where main scanning starts is determined. If no print data have been transferred (NO in step S14), the processing waits until print data are transferred. If print data have been transferred (YES in step S14), the processing advances to step S15.

In the first embodiment, for example, n4=10. The entire printing width of one main scanning is 19 blocks, and the number of ensured blocks is 10. n4 is equal to or smaller than the number of blocks which is obtained from the RAM capacity of the printing apparatus and the block size and can be ensured. The number of printing start blocks may be, e.g., 9. However, the margin for the data transfer rate is generally maximized, and the number of ensured blocks=10 is set as the number n4 of the printing start blocks.

In step S15, the carriage 101 of the printing apparatus 100 starts moving, and printing operation by one main scanning starts. At this time, data of blocks whose memory areas are not ensured are determined to have no print data, and null data are transferred to the printhead 104.

In step S16, the printing apparatus 100 stores the next print data in a block having undergone printing while executing print data.

In step S17, whether printing by one main scanning of the printhead 104 has ended is determined. If printing by one main scanning has not ended (NO in step S17), the processing waits until the end of printing by one main scanning. If printing by one main scanning has ended (YES in step S17), the processing ends.

The flow chart of FIG. 5 shows printing operation concerning one main scanning of the printhead 104. In practice, preparations for printing by the next main scanning are made parallel to printing by one main scanning. If all main scanning operations end and main scanning of one page ends, printing of one page ends.

When transfer of print data starts before the host apparatus 500 determines print data of one main scanning, and the printing time is shorter than the sum of the print data determination time and print data transfer time, transfer of print data may not catch up with the operation of the carriage 101 during one main scanning.

In this case, interruption of data during printing by one main scanning can be prevented by "starting transfer of print data of one main scanning from the host apparatus 500 to the printing apparatus 100 after the host apparatus 500 determines print data of at least one main scanning".

The first embodiment does not ensure the print buffer 4030 has enough capacity to store print data of one main scanning. If the host apparatus 500 increases the number of orifices used for one main scanning or sets a high driving frequency for the printhead 104, print data is readily interrupted during printing by one main scanning. The above-mentioned recovery processing degrades the printing quality, and it is important to minimize interruption.

As described above, the first embodiment achieves high-speed printing processing by controlling print data transfer corresponding to the main scanning/printing direction of the printhead 104 by the host apparatus 500 with the arrangement in which scanning starts before print data of main scanning is determined every main scanning. This control is particularly effective for the printing apparatus 100 having no print buffer 4030 of sufficient capacity to store print data of one main scanning.

Second Embodiment

The first embodiment has exemplified a case wherein the memory capacity of the print buffer 4030 is not sufficient. The present invention can also be applied to a case wherein the memory capacity of the print buffer 4030 is sufficient.

Processing executed by a printing system according to the second embodiment will be explained with reference to FIG. 6.

Figure 6:
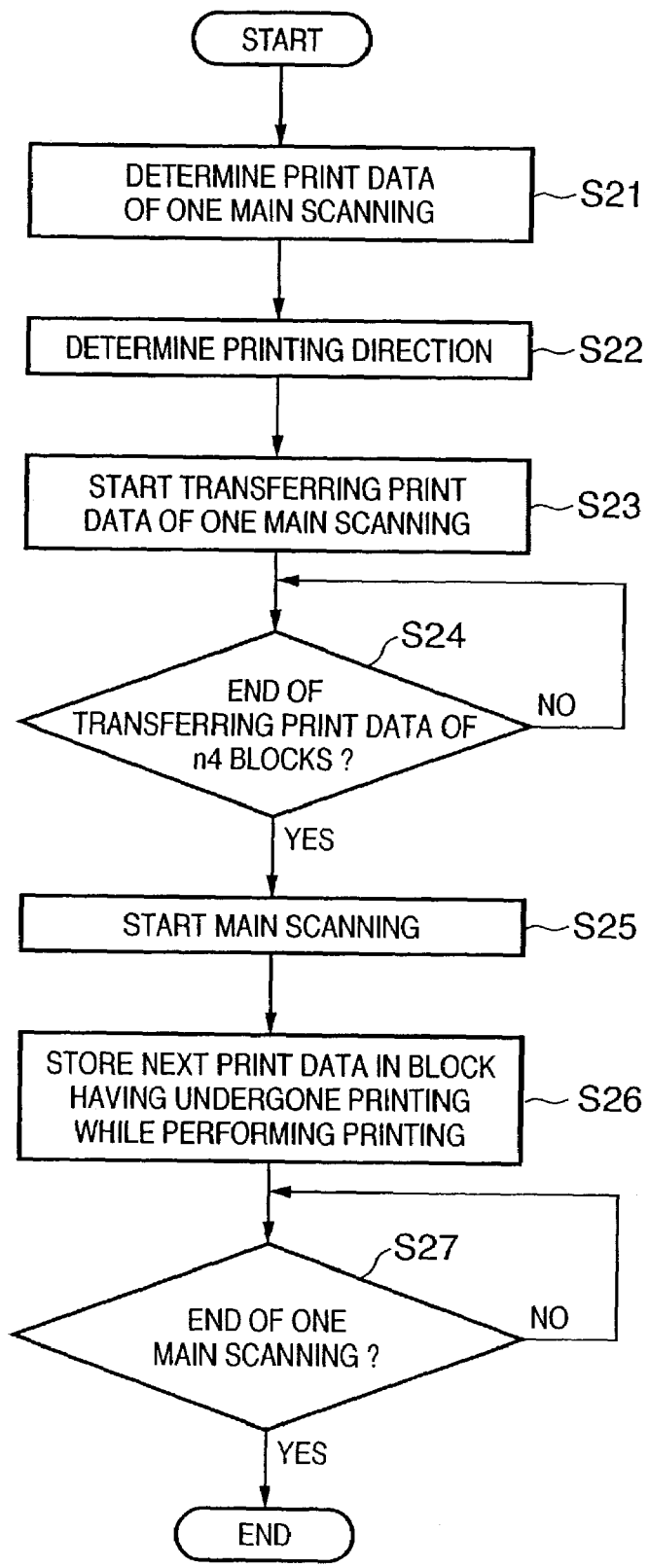
FIG. 6 is a flow chart showing processing executed by a printing system according to the second embodiment.

FIG. 6 is a flow chart showing processing executed by the printing apparatus according to the second embodiment.

In the second embodiment, the memory capacity of a print buffer 4030 is ensured for print data of one main scanning or more.

In step S21, a host apparatus 500 determines print data of one main scanning.

In step S22, the host apparatus 500 decides the main scanning direction of a printhead 104 of a printing apparatus 100, and transmits main scanning direction information to the printing apparatus 100. For two-way printing, the direction changes every main scanning (directions Q1 and Q2). For one-way printing, the same direction is set. To change the direction within one page, the host apparatus 500 properly transmits corresponding main scanning direction information to the printing apparatus 100.

In step S23, transfer of print data of one main scanning starts from the host apparatus 500 to the printing apparatus 100. The layout of print data coincides with the main scanning/printing direction.

In step S24, whether print data have been transferred by the number n4 (integer of 1 or more) of printing start blocks where main scanning starts is determined. If no print data have been transferred (NO in step S24), the processing waits until print data are transferred. If print data have been transferred (YES in step S24), the processing advances to step S25.

In the second embodiment, for example, n4=10. The entire printing width of one main scanning is 19 blocks, and the number of ensured blocks is 19. Main scanning therefore starts when print data up to block 10 are transferred. The number n4 of printing start blocks is a design item decided by the printing speed and data transfer rate.

In step S25, a carriage 101 of the printing apparatus 100 starts moving, and printing operation by one main scanning starts.

In step S26, the printing apparatus 100 stores the next print data in a block having undergone printing while executing print data.

In step S27, whether printing by one main scanning has ended is determined. If printing by one main scanning has not ended (NO in step S27), the processing waits until the end of printing by one main scanning. If printing by one main scanning has ended (YES in step S27), the processing ends.

The flow chart of FIG. 6 shows printing operation concerning one main scanning of the printhead 104. In practice, preparations for printing by the next main scanning are made parallel to printing by one main scanning. If all main scanning operations end and main scanning of one page ends, printing of one page ends.

In the second embodiment, the print buffer 4030 is managed for each block. However, the present invention is not limited to this. That is, when a print buffer capable of storing print data of one main scanning can be ensured, like the second embodiment, the print buffer 4030 may be managed for each raster corresponding to print data of one main scanning. Detailed management for each raster allows setting the printing start timing as slow as possible. The need for recovery processing against the interruption of transfer during printing can be minimized.

As described above, the second embodiment achieves high-speed printing processing by controlling print data transfer described in the first embodiment by the host apparatus 500 even when the print buffer 4030 has a sufficient memory capacity. Management of the print buffer 4030 for each raster can realize stable printing while maintaining high-speed printing.

The above embodiments have been explained by assuming that a droplet discharged from a printhead is ink and a liquid contained in an ink tank is ink. However, the content of the ink tank is not limited to ink. For example, the ink tank may contain a processing solution to be discharged onto a printing medium to increase the fixing properties, water resistance, or quality of a printed image.

The above embodiments can increase the density and resolution of printing by using a system which includes a means (e.g., an electrothermal transducer or laser beam) for generating heat energy as energy used to discharge ink and causes a state change of the ink by this heat energy, among other inkjet printing systems. The printhead is not limited to this system, and may discharge ink by using a piezoelectric element.

As a representative arrangement or principle, it is preferable to use the basic principle disclosed in, e.g., U.S. Pat. No. 4,723,129 or 4,740,796. This system is applicable to both so-called on-demand and continuous apparatuses. The system is particularly effective in an on-demand apparatus because at least one driving signal which corresponds to printing information and gives a rapid temperature rise exceeding nucleate boiling is applied to an electrothermal transducer which corresponds to a sheet or channel holding a liquid (ink), thereby causing this electrothermal transducer to generate heat energy and cause film boiling on the thermal action surface of a printhead, and consequently a bubble can be formed in the liquid (ink) in one-to-one correspondence with the driving signal.

By growth and shrinkage of this bubble, the liquid (ink) is discharged from an orifice to form at least one droplet. This driving signal is more preferably a pulse signal because growth and shrinkage of a bubble are instantaneously appropriately performed, so discharge of the liquid (ink) having high response is achieved.

This pulse driving signal is preferably a signal described in U.S. Pat. No. 4,463,359 or 4,345,262. Note that superior printing can be performed by the use of conditions described in U.S. Pat. No. 4,313,124, which concerns the rate of temperature rise on the thermal action surface.

The arrangement of a printhead can be a combination (a linear liquid channel or a right-angle liquid channel) of orifices, liquid channels, and electrothermal transducers disclosed in the patents described above. The present invention also includes arrangements using U.S. Pat. Nos. 4,558,333 and 4,459,600, in each of which the thermal action surface is placed in a bent region. Additionally, it is possible to use an arrangement based on Japanese Patent Laid-Open No. 59-123670, in which a common slot is used as a discharge portion of a plurality of electrothermal transducers, or Japanese Patent Laid-Open No. 59-138461, in which an opening for absorbing the pressure wave of heat energy is opposed to a discharge portion.

Furthermore, a full line type printhead having a length corresponding to the width of the largest printing medium printable by a printing apparatus can have a structure which meets this length by combining a plurality of printheads as disclosed in the aforementioned specifications or can be a single integrated printhead.

In addition, it is possible to use not only a cartridge type printhead, explained in the above embodiments, in which ink tanks are integrated with a printhead itself, but also an interchangeable chip type printhead which can be electrically connected to an apparatus main body and supplied with ink from the apparatus main body when attached to the apparatus main body.

Adding a recovering means or a preliminary means for a printhead to the printing apparatus described above is preferable because the printing operation can be further stabilized. Practical examples of the additional means for a printhead are a capping means, a cleaning means, a pressurizing or drawing means, and an electrothermal transducer or another heating element or a preliminary heating means combining them. A predischarge mode for performing discharge different from printing is also effective to perform stable printing.

A printing mode of the printing apparatus is not restricted to a printing mode using only a main color such as black. That is, the apparatus can have at least a composite color mode using different colors and a full color mode using mixed colors, regardless of whether a printhead is an integrated head or a combination of a plurality of heads.

The present invention is also achieved by supplying a software program (in the above embodiments, programs corresponding to flow charts shown in the accompanying drawings) for realizing the functions of the above-described embodiments to a system or apparatus directly or from a remote place, and reading out and executing the supplied program codes by the computer of the system or apparatus. In this case, the software need not be a program as long as it has a program function.

The present invention is therefore realized by program codes installed into the computer in order to realize functional processing of the present invention. That is, the present invention includes a computer program for realizing functional processing of the present invention.

In this case, the present invention can take any program form such as an object code, a program executed by an interpreter, or script data supplied to an OS as long as a program function is attained.

A recording medium for supplying the program includes a floppy disk, hard disk, optical disk, magnetooptical disk, MO, CD-ROM, CD-R, CD-RW, magnetic, tape, nonvolatile memory card, ROM, and DVD (DVD-ROM and DVD-R).

As another program supply method, the program can be supplied by connecting a client computer to an Internet homepage via the browser of the client computer, and downloading the computer program of the present invention or a compressed file containing an automatic installing function from the homepage to a recording medium such as a hard disk. The program can also be supplied by classifying program codes which constitute the program of the present invention into a plurality of files, and downloading the files from different homepages. That is, the present invention also contains a WWW server which allows a plurality of users to download the program files for realizing functional processing of the present invention by a computer.

The present invention can also be realized by the following method. That is, the program of the present invention is encrypted, stored in a storage medium such as a CD-ROM, and distributed to the user. A user who satisfies predetermined conditions is caused to download decryption key information from a homepage via the Internet. The user executes the encrypted program by using the key information, and installs the program in the computer.

The functions of the above-described embodiments are realized when the computer executes a readout program. Also, the functions of the above-described embodiments are realized when an OS or the like running on a computer performs part or all of actual processing on the basis of the instructions of the program codes.

The functions of the above-described embodiments are also realized when a program read out from a storage medium is written in the memory of a function expansion board inserted into a computer or the memory of a function expansion unit connected to the computer, and the CPU of the function expansion board or function expansion unit performs part or all of actual processing on the basis of the instructions of the program codes.

As many apparently widely different embodiments of the present invention can be made without departing from the spirit and scope thereof, it is to be understood that the invention is not limited to the specific embodiments thereof except as defined in the appended claims.

What is claimed is:

1. A printing apparatus which performs printing by driving a printhead on the basis of print data transmitted from a host apparatus, comprising:

main scanning means for scanning the printhead in a main scanning direction with respect to a printing medium;

buffer means for storing print data;

reception means for receiving, from the host apparatus, main scanning/printing direction information representing a main scanning/printing direction of the printhead;

storage means for storing, in said buffer means, print data corresponding to the printing direction represented by the main scanning/printing direction information received from the host apparatus; and control means for controlling printing by the printhead on the basis of the main scanning/printing direction information and the print data stored in said buffer means, wherein said buffer means stores print data used for printing during scanning of the printhead by said main scanning means, a data amount which can be stored is smaller than a print data amount for printing by one main scanning of the printhead by a width printable by main scanning of the printhead by said main scanning means, said storage means stores print data received from the host apparatus during the printing by scanning the printhead in the main scanning direction by said main scanning means, said control means starts the printing before completing receiving of print data for one main scanning of the printhead, receives print data transmitted by the host apparatus in parallel with the printing by scanning of the printhead after starting the printing and, if print data is interrupted during the main scanning, performs the main scanning again in a direction represented by the main scanning/printing direction corresponding to the current main scanning, and when the print data are stored up to a position corresponding to a predetermined column unit in said buffer means, said control means starts printing by the printhead on the basis of the main scanning/printing direction information and the print data stored in said buffer means.

2. The apparatus according to claim 1, wherein when print data are stored up to a specific column position in said buffer means, said control means starts printing by the printhead on the basis of the main scanning/printing direction information and the print data stored in said buffer means.

3. The apparatus according to claim 1, wherein the specific column unit is $2^{k1} \times k2$ (k1 and k2 are positive integers).

4. An information processing apparatus which transmits print data to a printing apparatus that has a buffer for storing print data and performs printing by scanning a printhead in a main scanning direction with respect to a printing medium on the basis of the print data stored in the buffer, wherein the printing apparatus stores print data received by said information processing apparatus during the printing by scanning the printhead in the main scanning direction and starts the printing before completing receiving of print data for one main scanning of the printhead, wherein when the print data are stored up to a position corresponding to a predetermined column unit in the buffer, the printing apparatus starts printing by the printhead on the basis of main scanning/printing direction information and the print data stored in the buffer, said information processing apparatus comprising:

generation means for generating print data corresponding to one main scanning of the printhead in the printing direction represented by the main scanning/printing direction information;

first transmission means for generating the main scanning/printing direction information representing a main scanning/printing direction of the printhead, and transmitting the main scanning/printing direction information to the printing apparatus; and second transmission means for transmitting the print data generated by said generation means to the printing apparatus, wherein said second transmission means transmits the print data during performing of printing by the printing apparatus and, if print data to be stored in the printing apparatus is interrupted during transmitting print data corresponding to the one main scanning of the printhead in scanning the printhead by the printing apparatus, transmits the print data corresponding to the current main scanning so as to make the printing apparatus perform the main scanning again in a direction represented by the main scanning/printing direction corresponding to the current main scanning.

5. A method of controlling a printing apparatus which has a buffer for storing print data and performs printing by scanning a printhead in a main scanning direction with respect to a printing medium on the basis of print data from a host apparatus that is stored in the buffer, comprising:

a reception step of receiving, from the host apparatus, main scanning/printing direction information representing a main scanning/printing direction of the printhead;

a storage step of storing, in the buffer, print data corresponding to the printing direction represented by the main scanning/printing direction information received from the host apparatus; and a control step of controlling printing by the printhead on the basis of the main scanning/printing direction information and the print data stored in the buffer, wherein said storage step stores print data used for printing during scanning of the printhead, a data amount which can be stored is smaller than a print data amount for printing by one main scanning of the printhead by a width printable by main scanning of the printhead, said storage step stores print data received from the host apparatus during the printing by scanning the printhead in the main scanning direction, said control step starts the printing before completing receiving of print data for one main scanning of the printhead, receives print data transmitted by the host apparatus in parallel with the printing by scanning of the printhead after starting the printing and, if print data is interrupted during the main scanning, performs the main scanning again in a direction represented by the main scanning/printing direction corresponding to the current main scanning, and when the print data are stored up to a position corresponding to a predetermined column unit in the buffer, said control step starts printing by the printhead on the basis of the main scanning/printing direction information and the print data stored in the buffer.

6. The method according to claim 5, wherein in the control step, when print data are stored up to a specific column position in the buffer, printing by the printhead starts on the basis of the main scanning/printing direction information and the print data stored in the buffer.

7. The method according to claim 5, wherein the specific column unit is $2^{k1} \times k2$ (k1 and k2 are positive integers).

8. A method of controlling an information processing apparatus which transmits print data to a printing apparatus that has a buffer for storing print data and performs printing by scanning a printhead in a main scanning direction with respect to a printing medium on the basis of the print data stored in the buffer, wherein the printing apparatus stores print data received by the information processing apparatus during the printing by scanning the printhead in the main scanning direction and starts the printing before completing receiving of print data for one main scanning of the printhead, wherein when the print data are stored up to a position corresponding to a predetermined column unit in the buffer, the printing apparatus starts printing by the printhead on the basis of main scanning/printing direction information and the print data stored in the buffer, said method comprising:

a generation step of generating print data corresponding to one main scanning of the printhead in the printing direction represented by the main scanning/printing direction information;

a first transmission step of generating the main scanning/printing direction information representing a main scanning/printing direction of the printhead, and transmitting the main scanning/printing direction information to the printing apparatus; and a second transmission step of transmitting the print data generated in the generation step to the printing apparatus, wherein said second transmission step transmits the print data during performing of printing by the printing apparatus and, if print data to be stored in the printing apparatus is interrupted during transmitting print data corresponding to the one main scanning of the printhead in scanning the printhead by the printing apparatus, transmits the print data corresponding to the current main scanning so as to make the printing apparatus perform the main scanning again in a direction represented by the main scanning/printing direction corresponding to the current main scanning.

9. A program of causing a computer to control a printing apparatus which has a buffer for storing print data and performs printing by scanning a printhead in a main scanning direction with respect to a printing medium on the basis of print data from a host apparatus that is stored in the buffer, comprising:

a program code for a reception step of receiving, from the host apparatus, main scanning/printing direction information representing a main scanning/printing direction of a printhead;

a program code for a storage step of storing, in the buffer, print data corresponding to the printing direction represented by the main scanning/printing direction information received from the host apparatus; and a program code for a control step of controlling printing by the printhead on the basis of the main scanning/printing direction information and the print data stored in the buffer, wherein said storage step stores print data used for printing during scanning of the printhead, a data amount which can be stored is smaller than a print data amount for printing by one main scanning of the printhead by a width printable by main scanning of the printhead, said storage step stores print data received from the host apparatus during the printing by scanning the printhead in the main scanning direction, said control step starts the printing before completing receiving of print data for one main scanning of the printhead, receives print data transmitted by the host apparatus in parallel with the printing by scanning of the printhead after starting the printing and, if print data is interrupted during the main scanning, performs the main scanning again in a direction represented by the main scanning/printing direction corresponding to the current main scanning, and when the print data are stored up to a position corresponding to a predetermined column unit in the buffer, said control step starts printing by the printhead on the basis of the main scanning/printing direction information and the print data stored in the buffer.

10. A program of causing a computer to control an information processing apparatus which transmits print data to a printing apparatus that has a buffer for storing print data and performs printing by scanning a printhead in a main scanning direction with respect to a printing medium on the basis of the print data stored in the buffer, wherein the printing apparatus stores print data received by the information processing apparatus during the printing by scanning the printhead in the main scanning direction and starts the printing before completing receiving of print data for one main scanning of the printhead, wherein when the print data are stored up to a position corresponding to a predetermined column unit in the buffer, the printing apparatus starts printing by the printhead on the basis of main scanning/printing direction information and the print data stored in the buffer, said program comprising:

a program code for a generation step of generating print data corresponding to one main scanning of the printhead in the printing direction represented by the main scanning/printing direction information;

a program code for a first transmission step of generating the main scanning/printing direction information representing a main scanning/printing direction of the printhead, and transmitting the main scanning/printing direction information to the printing apparatus; and a program code for a second transmission step of transmitting the print data generated in the generation step to the printing apparatus, wherein said second transmission step transmits the print data during performing of printing by the printing apparatus and, if print data to be stored in the printing apparatus is interrupted during transmitting print data corresponding to the one main scanning of the printhead in scanning the printhead by the printing apparatus, transmits the print data corresponding to the current main scanning so as to make the printing apparatus perform the main scanning again in a direction represented by the main scanning/printing direction corresponding to the current main scanning.

* * * * *